United States Patent
Tsai

(10) Patent No.: US 6,839,741 B1
(45) Date of Patent: Jan. 4, 2005

(54) FACILITY FOR DISTRIBUTING AND PROVIDING ACCESS TO ELECTRONIC MAIL MESSAGE ATTACHMENTS

(75) Inventor: Peter Ming Tsai, Colorado Springs, CO (US)

(73) Assignee: MCI, Inc., Ashburn, VA (US)

( * ) Notice: Subject to any disclaimer, the term of this patent is extended or adjusted under 35 U.S.C. 154(b) by 0 days.

(21) Appl. No.: 09/163,227

(22) Filed: Sep. 29, 1998

(51) Int. Cl.[7] .................. G06F 15/16; G06F 17/30; G06F 12/14
(52) U.S. Cl. .............. 709/217; 709/201; 709/207; 709/229; 707/9; 707/10; 713/201
(58) Field of Search ................. 709/200, 202, 709/203, 206, 217, 219, 246, 229, 248; 714/11, 4; 707/9, 10; 713/201

(56) References Cited

U.S. PATENT DOCUMENTS

| | | | |
|---|---|---|---|
| 5,771,355 A | * | 6/1998 | Kuzma ................ 709/232 |
| 5,781,901 A | * | 7/1998 | Kuzma ................ 707/10 |
| 5,903,723 A | * | 5/1999 | Beck et al. ........... 709/200 |
| 5,974,449 A | * | 10/1999 | Chang et al. ......... 709/206 |
| 6,212,265 B1 | * | 4/2001 | Duphorne ............ 379/142 |
| 6,256,739 B1 | * | 7/2001 | Skopp et al. ......... 709/229 |
| 6,275,953 B1 | * | 8/2001 | Vahalia et al. ....... 714/11 |

* cited by examiner

*Primary Examiner*—Paul U. Kang

(57) ABSTRACT

A facility stores attachments for electronic mail messages so that the messages may be transmitted to the intended recipients without the attachments. The recipients may then review and/or download the attachments by contacting the facility. This facility is especially useful in instances wherein the attachments are large. The facility eliminates the need to store multiple copies of the attachment throughout a system; thus consuming a great deal of memory space. In addition, the facility prevents the recipient from extensive delays that are often associated with downloading email messages that contain large attachments via a dial-up connection with a low transmission rate. The facility may be realized as a server and may be a web server so as to provide access to the attachments via an IP network.

67 Claims, 8 Drawing Sheets

FACILITY FOR DISTRIBUTING AND PROVIDING ACCESS TO ELECTRONIC MAIL MESSAGE ATTACHMENTS

TECHNICAL FIELD

The present invention relates generally to computer systems and more particularly to a facility for distributing and providing access to electronic mail message attachments.

BACKGROUND OF THE INVENTION

Attachments are files that are attached to electronic mail (email) messages. Typically, such email messages include text and an icon that represents the attachment. A user may gain access to the contents of the attachment by performing a designated operation (such as double clicking) on the icon that represents the attachment. In response to the designated operation, an application program associated with the type of attachment is activated to display the contents of the attachment. For example, if the attachment is a word processing document, double clicking on the icon for the attachment causes a word processing application program to begin executing and the contents of the word processing document are displayed within a window of the word processing application program.

Attachments can be quite large. As a result, emails with attachments may occupy a great deal of memory space. Moreover, transmitting emails with large attachments over communication pathways that have limited throughput can be particularly slow. For example, dial-up connections often have limited baud rates, and it may take an excessive amount of time to download an email message that contains a large attachment over such dial-up connections. Unfortunately, a party has no way of knowing beforehand whether an email contains an attachment or not. Hence, a party may have to unwittingly wait a long period of time when attempting to download email messages over a dial-up connection.

Another difficulty with large email attachments is that the attachments may require a substantial amount of memory space to store them. For example, suppose that a single email message containing a large attachment is sent to ten recipients. In such an instance, ten copies of the attachment must be stored at one or more locations within the system. If all of the emails are stored on a single server, ten copies of the attachment must be stored on the server. Ultimately, in instances where email messages are stored on recipient computer systems, a large amount of memory on each of the recipient computer systems is occupied by the attachment.

SUMMARY OF THE INVENTION

The present invention overcomes the limitations of the prior art by providing a facility for distributing and providing access to attachments for email messages. The facility may, in some embodiments, post attachments onto a server, such as a web server. Recipients may then view or download the attachments from the server. The textual portion of the emails may be sent directly to the recipients via email services. The email messages that are sent may be embellished to notify the recipients of the attachments. Thus, the recipients are not burdened with the storage requirements and time requirements typically associated with receiving and storing attachments. Furthermore, only a single copy of the attachment need be stored within the system rather than separate respective copies for each recipient.

In accordance with one aspect of the present invention, an electronic mail message for a recipient is received at a first device, such as a computer system. The electronic mail message includes both text and an attachment. The attachment is removed from the electronic mail message and stored at the first device. The text of the electronic mail message is sent from the first device to the recipient at the second device.

In accordance with another aspect of the present invention, an attachment for an electronic mail message is stored on a first computer system. The electronic mail message is sent without the attachment from a sender to at least one recipient on a second computer system. The recipient is enabled to remotely access the attachment of the first computer system from the second computer system.

In accordance with a further aspect of the present invention, an email is sent from a first computer towards a second computer. The email includes both text and an attachment. The email is received at an electronic mail server, and the attachment is stripped off the email to be stored at the electronic mail server. The text of the email is forwarded from the electronic mail server to the second computer, and the second computer is provided with access to the attachment on the server.

In accordance with an additional aspect of the present invention, a server computer system includes a detector for detecting that an email to a client contains an attachment. A stripper is provided for stripping the attachment from the email, and the attachment may be stored in a storage device or system on the server computer system. The server computer system also includes an interface for enabling the client to access the server computer system.

BRIEF DESCRIPTION OF THE DRAWINGS

An illustrative embodiment of the present invention will be described below relative to the following drawings.

DETAILED DESCRIPTION OF THE INVENTION

The illustrative embodiment of the present invention removes attachments from email messages and stores the attachments on servers. The servers may be, for example, web servers, that may be accessed over a network that utilizes the Internet Protocol (IP). Examples of such IP networks include the Internet, an intranet and a extranet. The textual portion of each email message with an attachment is forwarded directly to the intended recipients, and the intended recipients are notified of the attachment for the email message. The recipients may then view and/or download the attachment from the server, if desired.

The illustrative embodiment overcomes the problems associated with large attachments in conventional systems. Since only a single copy of the attachment is stored on the server, the attachment does not occupy an undue amount of memory space. There are not multiple copies of the attachment present in the system. Moreover, downloading emails over low baud rate connections does not take an inordinate amount of time. Nevertheless, recipients of emails still have the ability to view the attachments and can download the attachments, if desired, at their leisure.

In a first alternate implementation, a sender of an email posts an attachment on the server and sends the textual portion of the email onto the recipients. In a second alternate implementation, the sender sends the email with the attachment towards the recipients. An attachment server receives the email and strips the attachment from the email. The textual portion of the email is sent onto the recipients and the recipients are notified that the attachment has been removed. The attachment is stored at the attachment server for access by the recipients.

The illustrative embodiment of the present invention provides recipients with control over the downloading of attachments. A recipient can view an attachment on a web page and decide if they wish to download it or not. This allows recipients to avoid the downloading of attachments that they do not wish to receive. The attachments may be downloaded in either a native format or in a hypertext markup language (HTML) format. Typically, the HTML format occupies less memory space than the native format and takes less time to download.

The illustrative embodiment provides backup of attachments. The server on which the attachments are stored can serve as a backup mechanism so that attachments may be saved beyond a given period of time and may be deleted off of a recipients computer system.

The illustrative embodiment also may provide efficient management of document revisions. One master copy of a document may be stored on the server and a recipient may download the master copy, revise the master copy and store the revised version of the master copy back on the server.

Figure 1:
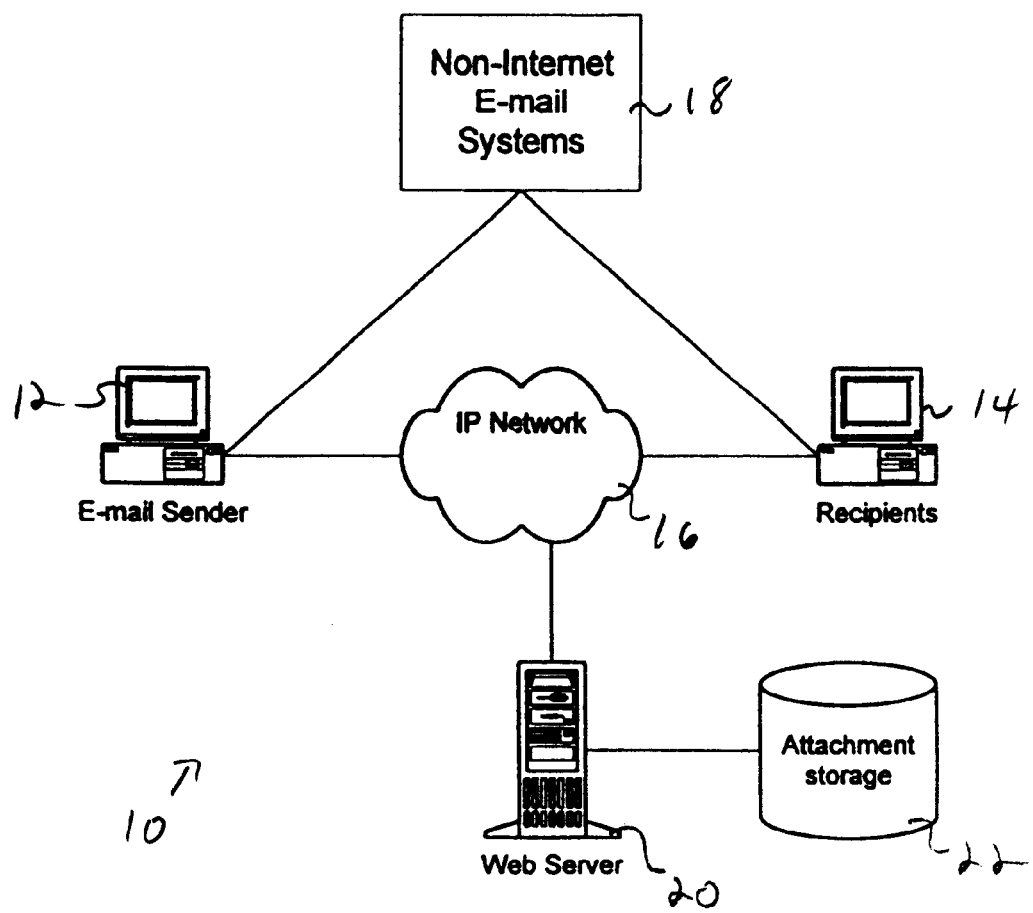
FIG. 1 is a logical diagram of components in a data processing environment that is suitable for practicing the illustrative embodiment of the present invention.

FIG. 1 depicts a data processing environment 10 that is suitable for practicing a first alternate implementation of the illustrative embodiment of the present invention. The data processing environment includes an email sender 12, such as a computer system upon which a sender generates an email message. The email message is destined to recipients 14 on respective destination computer systems. The email may be transmitted over a non-internet email system 18, such as MCI mail, or over an IP network mechanism 16 such as the Internet, an intranet or an extranet.

A web server 20 is connected to the IP network 16. The web server is a dedicated server computer system that provides recipients 14 with access to attachments. Specifically, recipients 14 may access the attachments by sending requests using the hypertext transfer protocol (HTTP). In addition, recipients 14 may download attachments from the web server 20 using the file transfer protocol (FTP). The web server 20 includes storage for storing attachments both in their native format and in an HTML format. The attachment storage 22 may be internal to the web server 20 or may be external on secondary storage devices, such as magnetic disk drives, optical disk drives and the like.

Those skilled in the art will appreciate the depiction of the data processing environment 10 in FIG. 1 is intended to be merely illustrative and not limiting of the present invention. Additional components may be included in the data processing environment. Moreover, the server 20 need not be a web server but rather may be a conventional server. Still further, the attachments need not be stored in both the native format and in an HTML format. In some alternate cases, the attachments may be stored solely in a native format or solely in an HTML format.

Figure 2:
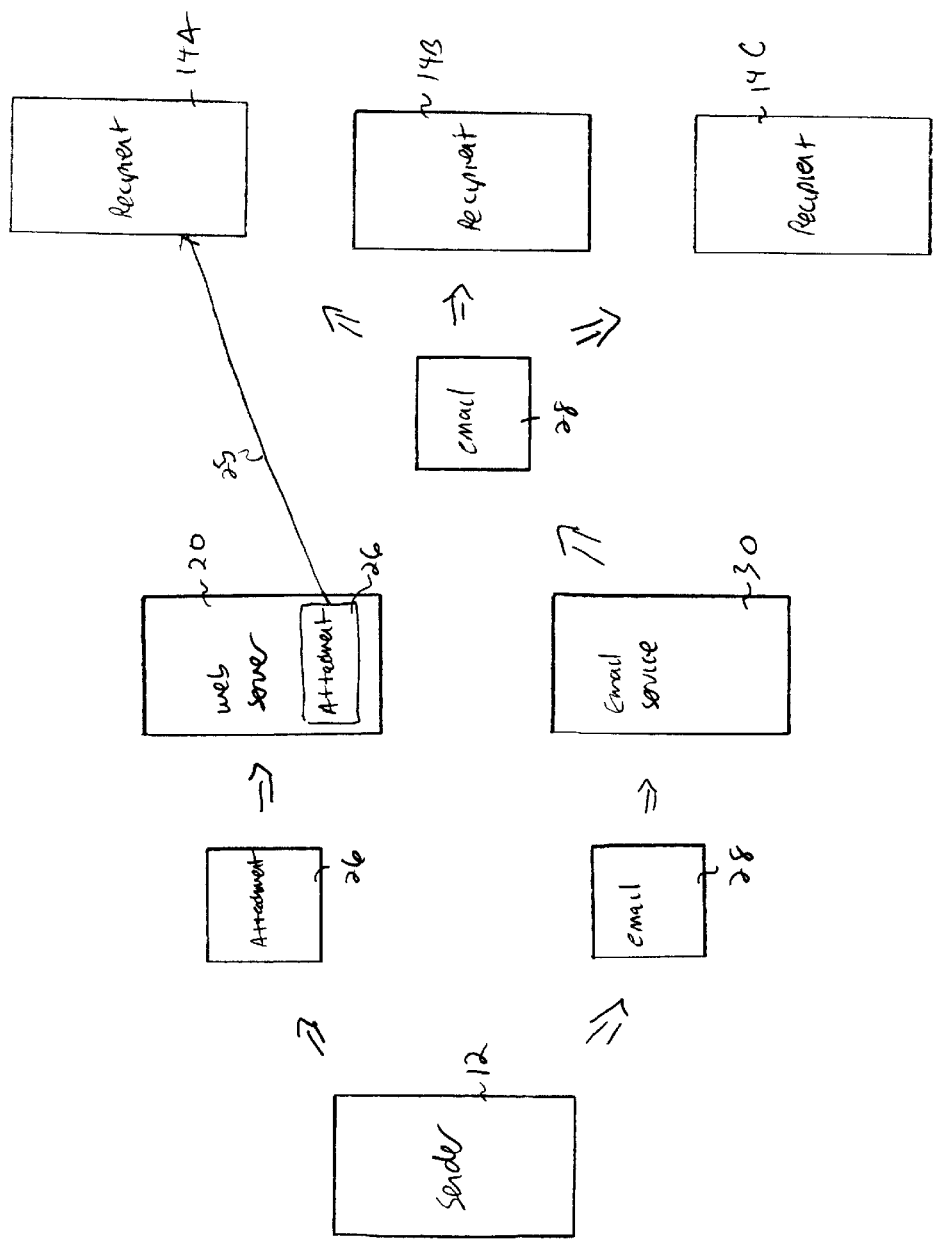
FIG. 2 illustrates the flow of information in a first alternate implementation provided in the illustrative embodiment.

FIG. 2 depicts the flow of information from the sender 12 to recipients 14A, 14B and 14C in the first implementation of the illustrative embodiment. Initially, the sender passes the attachment 26 to the web server 20, where the attachment is stored. The sender sends the email 28 via the email servers 30 to the recipients 14A, 14B and 14C. As will be described in more detail below, the email 28 may be embellished to notify the recipients 14A, 14B and 14C that there is an attachment on the web server 20. This notification may take the form of a textual message, a uniform resource locator (URL), a hyperlink, a graphic form of notification or other type of notification. The recipients 14A, 14B and 14C may then determine whether they desire to view or download the attachment 26. The arrow 25 depicted in FIG. 2 for recipient 14A indicates that the recipient 14A downloaded the attachment from the web server 20.

Figure 3A:
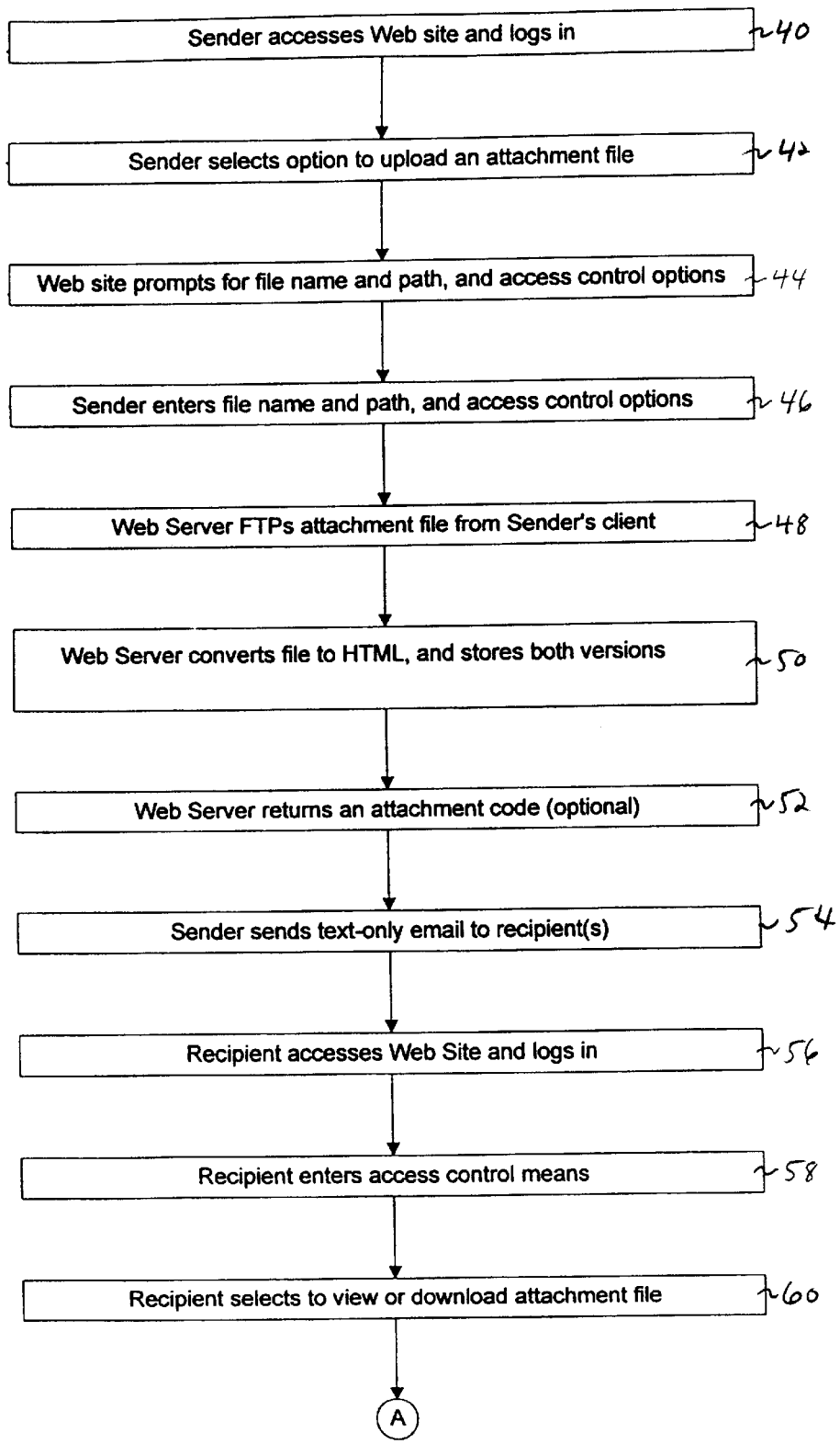
FIGS. 3A and 3B depict a flow chart illustrating the steps performed in the first alternate implementation of the illustrative embodiment.
Figure 3B:
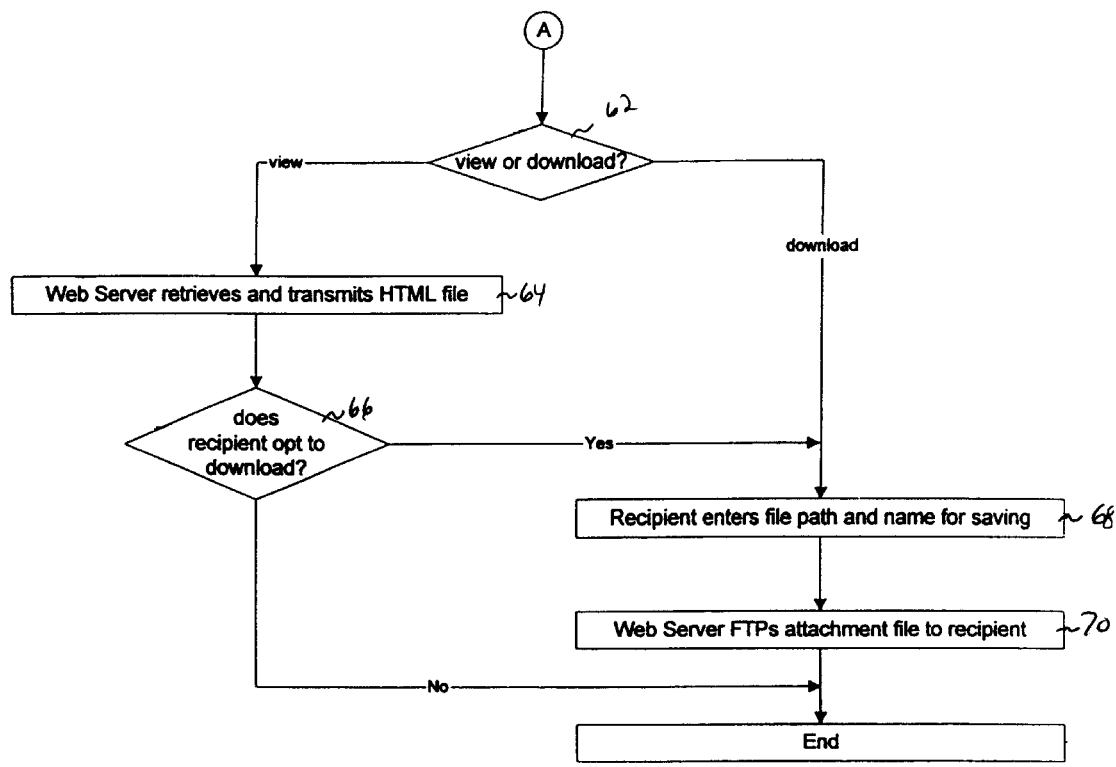

FIGS. 3A and 3B illustrate the steps that are performed in the first implementation in more detail. Initially, the sender 12 accesses a designated web site on the web server 20. The web site may have a particular associated URL. The web server 20 provides a web page that prompts the sender to log in. The sender 12 utilizes this web page to log in to the web server 20 (step 40 in FIG. 3A). The sender may be asked, for example, to provide a name and a password. If a proper name and password are provided, the user is authenticated and permitted to select among service options. The options include at least the options of uploading an attachment or downloading an attachment.

The sender 12 selects the option to upload an attachment file so that the attachment is stored on the web server 20 (step 42 in FIG. 3A). This attachment is part of the email 28 that the sender 12 desires to send to the recipients 14. The sender 12 is prompted to provide a file name and path for the attachment file on the computer system of the sender 12. This information tells the web server 20 where to locate the attachment file that is to uploaded. The sender may be prompted additionally to provide access control options. The sender 12 responds by entering access control options that specify who is able to access the attachment file and what access rights they have (See steps 44 and 46 in FIG. 3A). The information provided in the access control options may include an options control list that provides a list of user IDs for authorized recipients. The access control options may specify a password that is assigned to the attachment file and that must be provided in order for recipients to access or download the attachment file. The access control option may further include an attachment code that takes the form of an alpha numeric code used to identify and locate the attachment file. The attachment code must be provided by a recipient to access or download the attachment file.

After the appropriate information is entered by a sender 12, the web server 20 uploads the attachment file using the information that has been provided (step 48 in FIG. 3A). The web server 20 utilizes FTP to transfer the attachment file. The web server 20 then converts the attachment file into a web-friendly format, such as an HTML format. In general, the web server 20 may convert the attachment file into a format that is viewable and downloadable by a recipient over an IP network. The web server 20 stores the attachment file in the native format and in the HTML format (See step 50 in FIG. 3A). The attachments are stored in a database account for the recipients on the server. In instances where an attachment code is used, the web server 20 may return the attachment code to the sender 12 for incorporation into the email message 28 (step 52 in FIG. 3A).

The sender 12 sends a text only email to the recipients 14A, 14B and 14C (step 54 in FIG. 3A). Those skilled in the art will appreciate that the email message need not include just text but may also include other information including graphics, spreadsheets and the like. The email message is "attachment-free" in that is does not include the attachment. The email 28 typically contains a notification that informs the recipients of the attachment. The email may also include the attachment code and/or password as dictated by the choice of the sender 12. In some instances, the sender may opt to not require an attachment code or a password but rather may rely solely on an access control list. Alternately, the email may include a URL or a hyperlink for accessing the attachment on the web server 20. Still further, the email 28 may include a flag, such as a particular message, graphic or the like that indicates that an attachment is provided for the email.

After receiving the email 28, the recipients, 14 may decide whether they wish to view and/or download the attachment. Since the attachment is stored in an HTML format, the attachment may be displayed by the web server 20 as one or more web pages. If, a recipient 14 wishes to view and download the attachment 26, the recipient accesses the designated web site on the web server 20 and logs in (step 56 in FIG. 3A). In instances where an attachment code or password are specified for the attachment, the recipient must provide the attachment code and/or password to gain access to the attachment (step 58 in FIG. 3A). The recipient 14 may then be provided with options and select to view or download the attachment file (step 60 in FIG. 3A). If the recipient 14 chooses to view the attachment (See step 62 in FIG. 3B), the web server 20 retrieves the HTML version of the attachment and transmits the HTML document to the recipient over the IP network (See step 64 in FIG. 3B). After viewing the attachment, the recipient may opt to download the attachment (See step 56 in FIG. 3B).

In instances where the recipient 14 opts to download the attachment (See steps 62 and 66 in FIG. 3B), the recipient enters the file path and name at which the attachment file is to be saved (step 68 in FIG. 3B) and then the web server downloads the attachment to the recipient (step 70 in FIG. 3B). The web server 20 utilizes FTP to download the attachment to the recipient 14. Those skilled in the art will appreciate that other protocols may be utilized to download the attachment to the recipient 14. The attachment may be downloaded in either the native format or in the HTML format. Preferably, the attachment file is downloaded in the HTML format so as to utilize less network bandwidth and to minimize the amount of storage occupied by the attachment on the computer system of the recipient.

Figure 4:
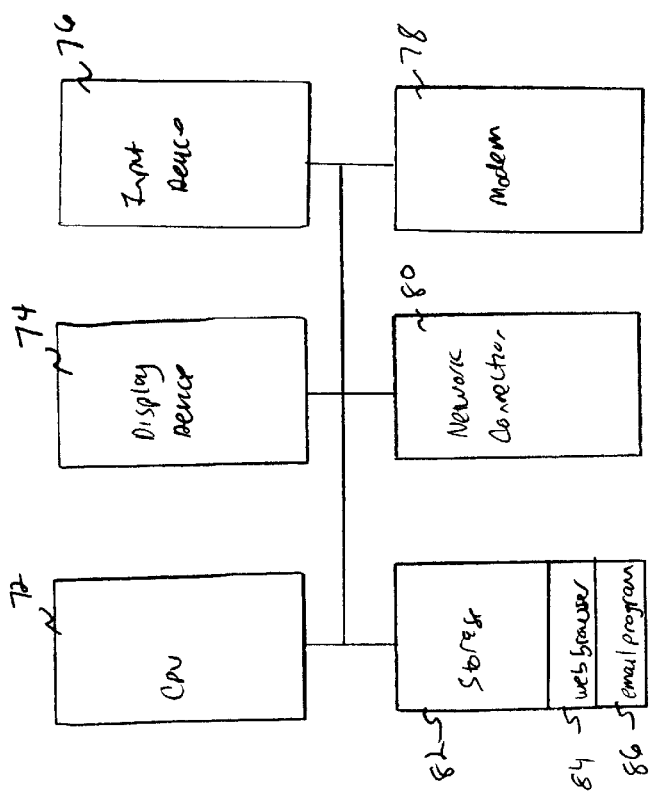
FIG. 4 depicts a block diagram of a recipient computer system suitable for use in the illustrative embodiment of the present invention.

FIG. 4 is a block diagram that illustrates a suitable architecture for the computer system of the recipient 14. The computer system includes a central processing unit (CPU) 72, such as a conventional microprocessor. The computer system may include a display device 74, such as a video display device and one or more input devices 76, such as a keyboard, a mouse, or a microphone. The computer system may include a modem 78 for facilitating communications over analog telephone lines, cable lines or the like. The modem 78 may be utilized to connect the computer system with a web server 20. The computer system may also include a network connection 82 connecting the computer system with a local area network (LAN). The computer system includes a storage 82 that may hold both programs and data. The storage 82 holds a copy of a web browser 84 that is used to communicate with the web server 20. The web browser includes an HTML engine. In addition, the storage 82 holds a copy of an email program 86 that facilitates email communications.

Figure 5:
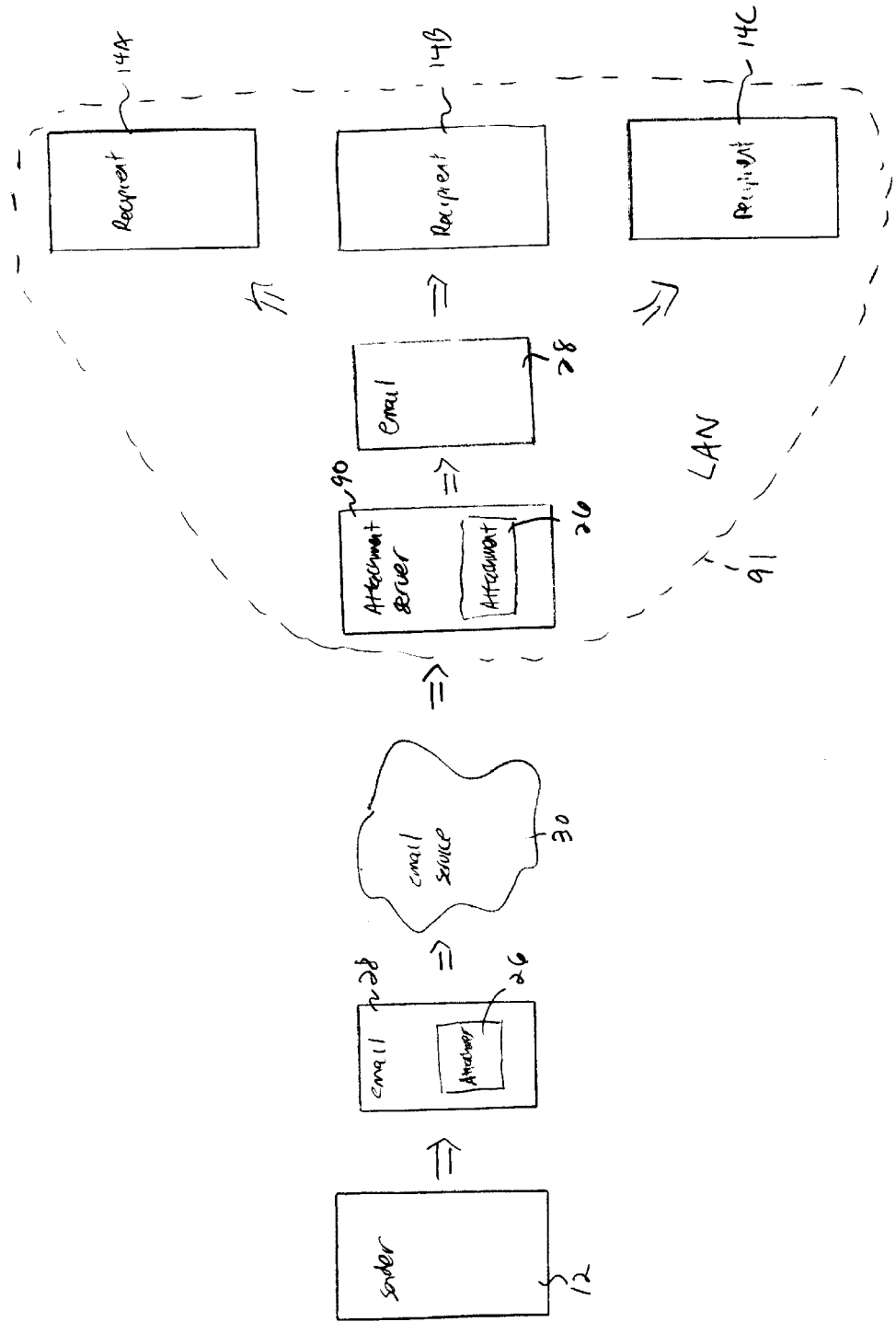
FIG. 5 depicts the flow of information and a second alternate implementation of the illustrative embodiment of the present invention.

FIG. 5 depicts the flow of information in a second alternate implementation of the illustrative embodiment. In this second alternate implementation, the sender does not send the attachments to the web server but rather sends the email with the attachment towards the recipients. An attachment server intercepts the email and strips the attachment off of the email and fowards the remaining content of the email onto the recipients.

The sender 12 sends the email 28 with the attachment 26 towards the recipients 14A, 14B and 14C via an email service 30. The email service 30 may take many forms including POP 3, IMAP 4, Microsoft Exchange, Microsoft Mail, or other email services. The recipients 14A, 14B and 14C subscribe to a service provided by the attachment server 90. This service strips attachments from incoming emails for the recipients. The attachment server 90 may also serve as an email gateway for the recipients 14A, 14B and 14C. The attachment server 90 receives the email 28 with the attachment 26. The attachment server 90 includes a detector that detects the presence of the attachment 26. The attachment server 90 then activates a stripper that strips the attachment 26 from the email 28. The attachment server sends the remaining portion of the email 28 onto the recipients 14A, 14B and 14C. The attachment 26 may be stored at the attachment server 90 in the native format or in an HTML format. The attachment server may include a converter for converting the attachment from the native format into the HTML format. Several conventional application programs (e.g. Microsoft Word) contain converters for performing such a conversion. This configuration is especially well-adopted for an instance wherein the attachment server 90 serves as an email gateway for a given LAN 91 that interconnects the recipients 14A, 14B, and 14C.

Figure 7:
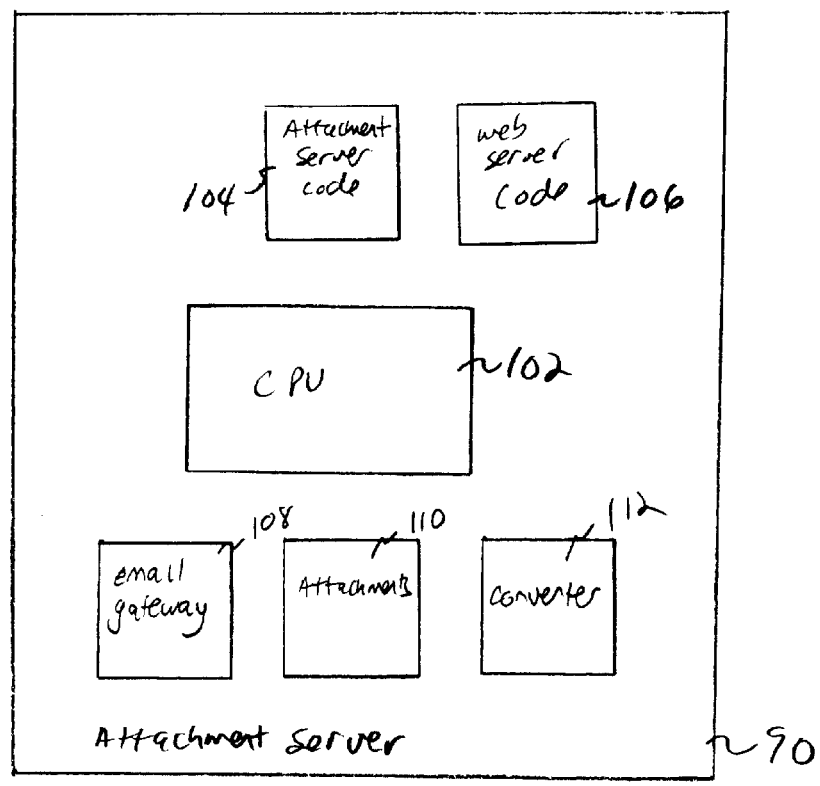
FIG. 7 illustrates the attachment server of FIG. 5 in more detail.

FIG. 7 depicts components of the attachment server 90 in more detail. The attachment server 90 includes a CPU 102 and includes programs and data. Specifically, the attachment server 90 includes attachment server code 140 for performing the detection stripping and the like as described above. The attachment server 90 may also include web server code 106 that enables the attachment server to act as a web server. In instances wherein the attachment server 90 is also an email server, the attachment server includes email gateway code 108. The attachment server 90 may store the attachments 110 in both data format and in HTML format. Furthermore, the attachments may include a converter 112 for converting the attachments from a native format into an HTML format.

Figure 6:
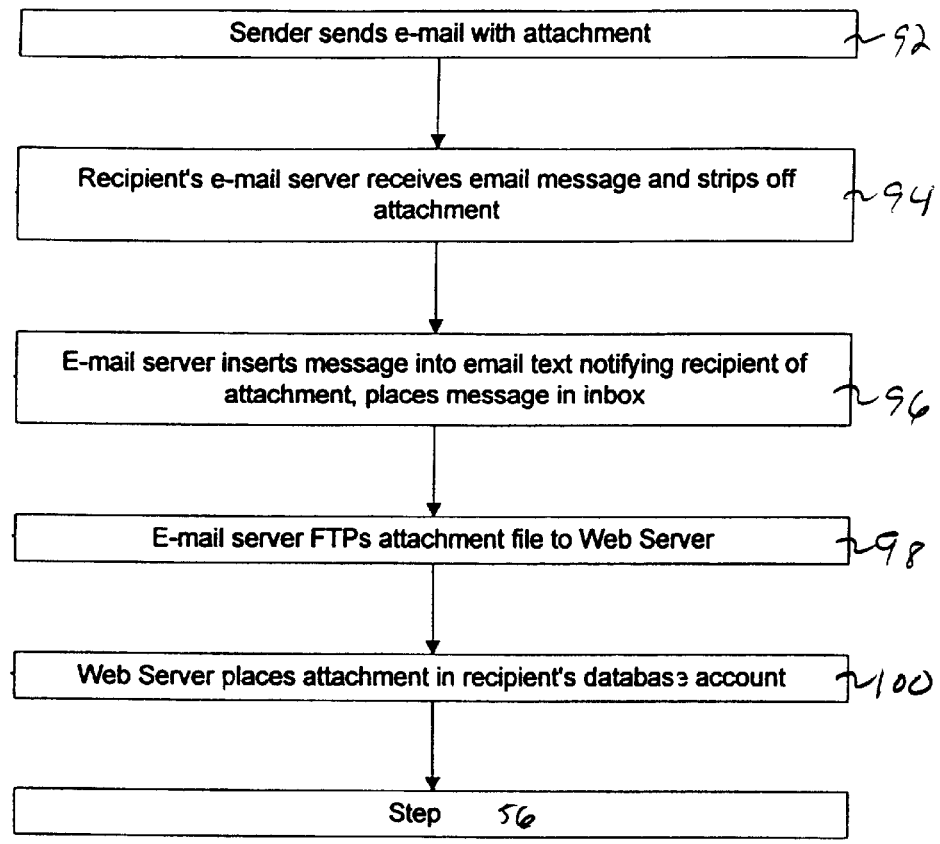
FIG. 6 is a flow chart illustrating the steps performed in the second alternate implementation of the illustrative embodiment.

FIG. 6 is a flow chart illustrating the steps that are performed in the second implementation of the illustrative embodiment. Initially, the sender 12 sends the email 28 with the attachment 26 (step 92 in FIG. 6). The recipients email server i.e. attachment server 90, receives the email message and strips off the attachment 26 (step 94 in FIG. 6). The attachment server 90 then inserts a notification into the email 28 that notifies the recipients 14a, 14b and 14c of the presence of the attachment. The attachment server 90 may choose to store the attachment 26 at the attachment server.

Preferably, the attachment server 90 sends the attachment to the web server 20 (step 98 in FIG. 6). The web server 20 then places the attachment in the database account for the recipient (step 100 in FIG. 6). The process then proceeds as depicted in FIGS. 3A and 3B beginning at step 56.

Those skilled in the art will appreciate that the attachment server 90 need not be an email server but rather may be a distinct server that is in communication with the email server. Moreover, the attachment server may itself be a web server. The conversion of the attachment into an HTML format may be performed by either the attachment server 90 or the web server 20.

While the present invention has been described with reference to an illustrative embodiment thereof, those skilled in the art will appreciate that various changes in form and detail may be made without departing from the intended scope of the invention as defined in the appended claims. For example, the attachments need not be stored in an HTML format but may be stored in other mark-up language formats or in formats that are viewable and downloadable over an IP network.

What is claimed is:

1. In a data processing environment having a first device and a second device, a method comprising the steps of:
   receiving an electronic mail message for a recipient at the first device;
   wherein said electronic mail message includes text and an attachment;
   removing the attachment from the electronic mail message at the first device and storing the attachment on the first device;
   controlling access to the stored attachment for authorized recipients of the attachment including providing access to the attachment only to user identifications on an access control list;
   sending the text of the electronic mail message from the first device to the recipient at the second device; and
   transmitting the stored attachment to the recipient only if the recipient corresponds to one of the user identifications on the access control list.

2. The method of claim 1 further comprising the step of notifying the recipient of the attachment.

3. The method of claim 2 wherein notifying the recipient of the attachment comprises adding information to the text of the electronic mail message prior to sending the text.

4. The method of claim 3 wherein the information that is added to the text includes a uniform resource location (URL) for the attachment.

5. The method of claim 1 further comprising the step of converting the attachment into a hypertext document.

6. The method of claim 1 further comprising the step of converting the attachment into a hypertext markup language (HTML) document.

7. The method of claim 1 wherein the first device is a web server.

8. The method of claim 1 wherein the first device and the second device are interconnected by a local area network.

9. The method of claim 8 wherein the electronic mail message originates from outside the local area network.

10. The method of claim 1 further comprising the steps of:
    receiving a request at the first device from the recipient to access the attachment; and
    in response to the request from the recipient, providing the recipient with access to the attachment.

11. The method of claim 1 further comprising the step of downloading the attachment from the second device to the first device.

12. The method of claim 11 wherein the attachment is downloaded only upon request by the recipient.

13. The method of claim 1 wherein the email is sent from a sender and wherein the step of removing the attachment is performed transparently relative to the sender.

14. The method of claim 1 wherein controlling access to the stored attachment for authorized recipients of the attachment further comprises the recipient providing a password assigned to the attachment in order to access or download the attachment from the first device.

15. The method of claim 1 wherein controlling access to the stored attachment for authorized recipients of the attachment further comprises the recipient providing an attachment code used to identify and locate the attachment in order to access or download the attachment from the first device.

16. In a system having an electronic mail service that permits the transfer of electronic mail messages with a first computer system and a second computer system, a method comprising the steps of:
    storing an attachment for an electronic mail message on the first computer system;
    controlling access to the stored attachment for authorized recipients of the attachment including providing access to the attachment only to user identifications on an access control list;
    sending the electronic mail message without the attachment from a sender to at least one recipient on the second computer system; and
    enabling the recipient to remotely access the attachment on the first computer system from the second computer system only if the recipient corresponds to one of the user identifications on the access control list.

17. The method of claim 16 further comprising the step of using the file transfer protocol (FTP) to transfer the attachment from the sender to the first computer system.

18. The method of claim 16 wherein the electronic mail message is from the sender to multiple recipients and wherein the multiple recipients are enabled to remotely access the attachment on the first computer system based on said access control options.

19. The method of claim 16 wherein the first computer system is part of an Internet Protocol (IP) network and the recipient communicates with the first computer system via the internet protocol.

20. The method of claim 16 wherein the first computer system is a web server.

21. The method of claim 16 further comprising the step of converting the attachment into a format that is viewable by a web browser.

22. The method of claim 16 wherein the step of storing the attachment comprises storing the attachment as one or more web pages.

23. The method of claim 16 further comprising the step of downloading the attachment to the recipient from the first computer system.

24. The method of claim 16 further comprising the step of manipulating the electronic mail message to notify the recipient of the attachment.

25. The method of claim 16 wherein controlling access to the stored attachment for authorized recipients of the attachment further comprises the recipient providing a password assigned to the attachment in order to access or download the attachment from the first device.

26. The method of claim 16 wherein controlling access to the stored attachment for authorized recipients of the attachment further comprises the recipient providing an attachment code used to identify and locate the attachment in order to access or download the attachment from the first device.

27. In a system having a first device, a second device, a web server and an electronic mail service for transferring electronic mail messages, a method, comprising the steps of:

generating an electronic mail message from a sender to a recipient at the first device, wherein the electronic mail message includes a textual portion and an attachment;

storing the attachment on the web server;

controlling access to the stored attachment for authorized recipients of the attachment including providing access to the attachment only to user identifications on an access control list;

adding a notification of the attachment into the electronic mail message at the web server;

sending the textual portion of the electronic mail message along with the notification from the server to the sender at the second device; and facilitating access by the recipient to the attachment on the web server only if the recipient corresponds to one of the user identifications on the access control list.

28. The method of claim 27 wherein the attachment is stored as one or more web pages on the web server.

29. The method of claim 27 wherein the second device includes a web browser and wherein the web browser is used by the recipient to access the attachment at the web server.

30. The method of claim 27 wherein controlling access to the stored attachment for authorized recipients of the attachment further comprises the recipient providing a password assigned to the attachment in order to access or download the attachment from the first device.

31. The method of claim 27 wherein controlling access to the stored attachment for authorized recipients of the attachment further comprises the recipient providing an attachment code used to identify and locate the attachment in order to access or download the attachment from the first device.

32. In a system having a first computer, an electronic mail server and a second computer, wherein the second computer is a client of the electronic mail server, a method comprising the steps of:

sending an email from the first computer toward the second computer, wherein said email includes both text and an attachment;

receiving the email at the electronic mail server;

stripping the attachment off the email and storing it at the electronic mail server;

controlling access to the stored attachment for authorized recipients of the attachment including providing access to the attachment only to user identifications on an access control list;

forwarding the text of the email from the electronic mail server to the second computer; and providing the second computer with access to the attachment on the electronic mail server only if the recipient corresponds to one of the user identifications on the access control list.

33. The method of claim 32 further comprising the step of converting the attachment into a format that is viewable by a web browser.

34. The method of claim 32 wherein the step of providing the second computer with access to the attachment comprises allowing a user of the second computer to view the contents of the attachment.

35. The method of claim 32 wherein the step of providing the second computer with access to the attachment comprises downloading the attachment from the server to the second computer.

36. The method of claim 32 wherein controlling access to the stored attachment for authorized recipients of the attachment further comprises the recipient providing a password assigned to the attachment in order to access or download the attachment from the first device.

37. The method of claim 32 wherein controlling access to the stored attachment for authorized recipients of the attachment further comprises the recipient providing an attachment code used to identify and locate the attachment in order to access or download the attachment from the first device.

38. In a data processing environment having a first device and a second device, a computer-readable medium holding computer-executable instructions for performing a method comprising the steps of:

receiving an electronic mail message for a recipient at the first device, wherein said electronic mail message includes text and an attachment;

removing the attachment from the electronic mail message at the first device and storing the attachment on the first device;

controlling access to the stored attachment for authorized recipients of the attachment including providing access to the attachment only to user identifications on an access control list;

sending the text of the electronic mail message from the first device to the recipient at the second device; and transmitting the stored attachment to the recipient only if the recipient corresponds to one of the user identifications on the access control list.

39. The computer-readable medium of claim 36 wherein the method further comprises notifying the recipient of the attachment.

40. The computer-readable medium of claim 39 wherein notifying the recipient of the attachment comprises adding information to the text of the electronic mail message prior to sending the text.

41. The computer-readable medium of claim 40 wherein the information that is added to the text includes a uniform resource location for the attachment.

42. The computer-readable medium of claim 36 wherein the method further comprises the step of converting the attachment into a hypertext document.

43. The computer-readable medium of claim 36 wherein the method further comprises the step of converting the attachment into a hypertext markup language (HTML) document.

44. The computer-readable medium of claim 36 wherein the first device is a web server.

45. The computer-readable medium of claim 44 wherein the attachment is stored as one or more web pages.

46. The computer-readable medium of claim 36 wherein the method further comprises the steps of:

receiving a request at the first device from the recipient to access the attachment; and in response to the request from the recipient, providing the recipient with access to the attachment.

47. The computer-readable medium of claim 36 wherein the method further comprises the step of downloading the attachment from the second device to the first device.

48. The computer-readable medium of claim 36 wherein the email is sent from a sender and wherein the step of removing the attachment is performed transparently relative to the sender.

49. The computer-readable medium of claim 38 wherein controlling access to the stored attachment for authorized recipients of the attachment further comprises the recipient providing a password assigned to the attachment in order to access or download the attachment from the first device.

50. The computer-readable medium of claim 38 wherein controlling access to the stored attachment for authorized recipients of the attachment further comprises the recipient providing an attachment code used to identify and locate the attachment in order to access or download the attachment from the first device.

51. In a system having an electronic mail service that permits the transfer of electronic mail messages with a first computer system and a second computer system, a computer-readable medium holding computer-executable instructions for performing a method comprising the steps of:

storing an attachment for an electronic mail message on the first computer system;

controlling access to the stored attachment for authorized recipients of the attachment including providing access to the attachment only to user identifications on an access control list;

sending the electronic mail message without the attachment from a sender to at least one recipient on the second computer system; and enabling the recipient to remotely access the attachment on the first computer system from the second computer system only if the recipient corresponds to one of the user identifications on the access control list.

52. The computer-readable medium of claim 51 wherein the electronic mail message is from the sender to multiple recipients and wherein the multiple recipients are enabled to remotely access the attachment on the first computer system.

53. The computer-readable medium of claim 51 wherein the method further comprises the step of converting the attachment into a format that is viewable by a web browser.

54. The computer-readable medium of claim 51 wherein the step of storing the attachment comprises storing the attachment as one or more web pages.

55. The computer-readable medium of claim 51 wherein the method further comprises the step of downloading the attachment to the recipient from the first computer system only if each of the recipients correspond to one of the user identifications on the access control list.

56. The computer-readable medium of claim 51 wherein controlling access to the stored attachment for authorized recipients of the attachment further comprises the recipient providing a password assigned to the attachment in order to access or download the attachment from the first device.

57. The computer-readable medium of claim 51 wherein controlling access to the stored attachment for authorized recipients of the attachment further comprises the recipient providing an attachment code used to identify and locate the attachment in order to access or download the attachment from the first device.

58. A server computer system, comprising:

a detector for detecting that an email to a client includes an attachment;

a stripper for stripping the attachment from the email;

a storage for storing the attachment that has been stripped from the email; and an interface for enabling the client to access the server computer system based on access control options, wherein the server computer system provides controlled access to the stored attachment for authorized recipients of the attachment including providing access to the attachment only to user identifications on an access control list and transmitting the stored attachment to the recipient only if the recipient corresponds to one of the user identifications on the access control list.

59. The server computer system of claim 56 wherein the system is a web server.

60. The server computer system of claim 56 further comprising a converter for converting the attachment into one or more web pages for storage in the storage.

61. The server computer system of claim 56 wherein the interface is an Internet Protocol (IP) interface that interfaces with an IP network.

62. The server computer system of claim 56, the controlled access to the stored attachment for authorized recipients of the attachment further comprising the recipient providing a password assigned to the attachment in order to access or download the attachment from the first device.

63. The server computer system of claim 56, the controlled access to the stored attachment for authorized recipients of the attachment further comprising the recipient providing an attachment code used to identify and locate the attachment in order to access or download the attachment from the first device.

64. A method of providing electronic mail, the method comprising:

detaching an attachment from an electronic mail message;

transmitting the electronic mail message without the attachment to a user; and controlling access to the stored attachment for authorized recipients of the attachment including providing access to the attachment only to user identifications on an access control list; and transmitting the stored attachment to the recipient only if the recipient corresponds to one of the user identifications on the access control list.

65. A method according to claim 64, further comprising:

assigning a password to the attachment, wherein the password is required for access to the attachment.

66. A method according to claim 64, further comprising:

assigning an attachment code to the attachment to identify and locate the attachment.

67. A method according to claim 64, further comprising:

specifying a list of users authorized to access the attachment, wherein the user is denied access if the user is not on the list.

* * * * *